US008473254B2

(12) United States Patent
Morgenstern et al.

(10) Patent No.: US 8,473,254 B2
(45) Date of Patent: Jun. 25, 2013

(54) METHODS FOR CONFIGURING AIRCRAFT TO MEET PERFORMANCE GOALS AND SHOCK WAVE DISTURBANCE CONSTRAINTS

(75) Inventors: John M. Morgenstern, Lancaster, CA (US); James B. Bach, Lancaster, CA (US); Alan E. Arslan, Santa Clarita, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 277 days.

(21) Appl. No.: 10/714,276

(22) Filed: Nov. 14, 2003

(65) Prior Publication Data

US 2005/0116108 A1  Jun. 2, 2005

(51) Int. Cl.
G06F 17/50 (2006.01)
(52) U.S. Cl.
USPC .......................................................... 703/1
(58) Field of Classification Search
USPC ............. 244/45 R, 35 R, 87; 703/1; 434/372; 706/919
See application file for complete search history.

(56) References Cited

U.S. PATENT DOCUMENTS

| | | | |
|---|---|---|---|
| 2,997,256 A | 8/1961 | Walker | |
| 3,310,262 A | 3/1967 | Robins et al. | |
| 3,737,119 A * | 6/1973 | Cheng | 244/1 N |
| 4,598,886 A | 7/1986 | Friebel et al. | |
| 5,627,949 A * | 5/1997 | Letcher, Jr. | 345/420 |
| 5,923,573 A * | 7/1999 | Hatanaka | 703/2 |
| 6,445,390 B1 * | 9/2002 | Aftosmis et al. | 345/421 |
| 6,588,703 B1 * | 7/2003 | Hartmann | 244/35 R |
| 6,698,684 B1 * | 3/2004 | Henne et al. | 244/1 N |
| 2002/0043589 A1 * | 4/2002 | Ruffin | 244/130 |

OTHER PUBLICATIONS

Sriram K. Rallabhandi and Dmitri N. Mavris, An Unstructured Wave Drag Code for Preliminary Design of Future Supersonic Aircraft, American Institue of Aeronautics and Astronautics Paper, pp. 1-8, Aerospace Systems Design Lab, Georgia Tech, Atlanta.

Minoru Yoshimoto, Naoki Uchiyama, Optimization of Canard Surface Positioning of Supersonic Business Jet for Low Boom and Low Drag Design, American Institue of Aeronautics and Astronautics, 2003, pp. 1-10, AIAA 2003-3576, 33rd AIAA Fluid Dyanics Conference and Exhibit, Orlando, Florida, Jun. 23-27, 2003.

Yoshikazu Making, Ken'Ichiro Suzuki, Masayoshi Noguchi and Kenji Yoshida, Non-Axisymmetrical Fuselage Shape Modification for Drag Reduction of a Low Sonic-Boom Airplane, American Institue of Aeronautics and Astronautics, 2003, pp. 1-11, AIAA 2003-557, 41st Aerospace Sciences Meetina and Exhibit, Jan. 6-9, 2003, Reno, Nevada.

(Continued)

Primary Examiner — Tien Dinh

(57) ABSTRACT

A system and method for configuring an aircraft for low sonic boom supersonic flight conditions includes redistributing lift of a wing by configuring the wing with one or more areas of far-field expansion ahead of areas of far-field compression. An equivalent area distribution goal curve is scaled to account for the equivalent area reduction due to excursions below to goal curve. A relaxed constraint allows the equivalent area distribution of the aircraft to be at or below the equivalent area distribution goal curve to enable multiple parameters to be configured to meet the equivalent area distribution constraint, as well as other constraints. The system and method can be adapted to aid in the design of any type of vehicle whose surfaces are subject to supersonic fluid flow, especially to reduce sonic boom.

22 Claims, 10 Drawing Sheets

OTHER PUBLICATIONS

Donald C. Howe, Sonic Boom Reduction Through the Use of Non-Axsymmetric Configuration Shaping, American Institue of Aeronautics and Astronautics, 2003, pp. 1-9, AIAA 2003-929, 41st Aerospace Sciences Meeting and Exhibit, Jan. 6-9, 2003, Reno, Nevada.

Charbel Farhat, Brian Argrow, Melike Nikbay and Kurt Maute, A Shape Optimization Methodology with F-Function Lobe Balancing for Mitigating the Sonic Boom, American Institute of Aeronautics and Astronautics, 2002, pp. 1-9, AIAA 2002-5551, 9th AIAA/ISSMO Symposium on Multidisciplinary Analysis and Optimization, Sep. 4-6, 2002, Atlanta Georgia.

Frank Marconi, Rodney D.W. Bowersox and Joseph A. Schetz, Sonic Boom Alleviation Using Keel Configurations, Journal of Aircraft, vol. 40, No. 2, Mar.-Apr. 2003, pp. 363-369.

Christine M. Darden, Sonic Boom Minimization with Nose-Bluntness Relaxation, NASA, 1979, pp. 1-50, NASA Technical Paper 1348, USA.

PCT International Search Report dated Oct. 13, 2005.

\* cited by examiner

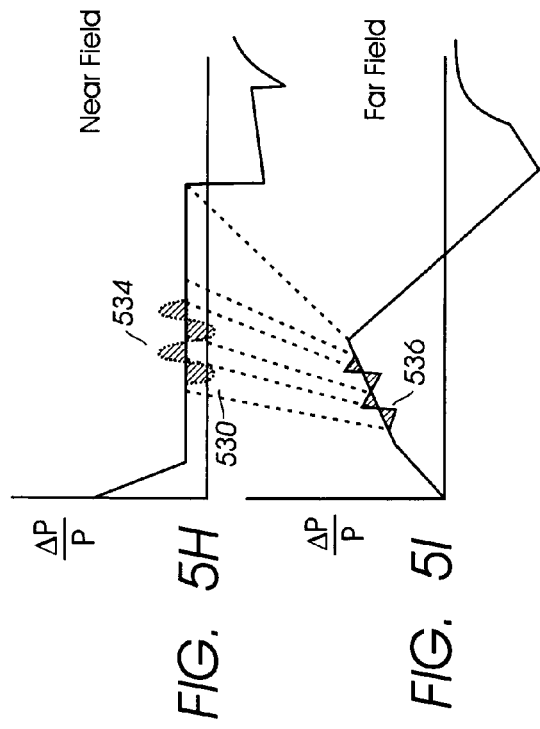
FIG. 5E
FIG. 5F
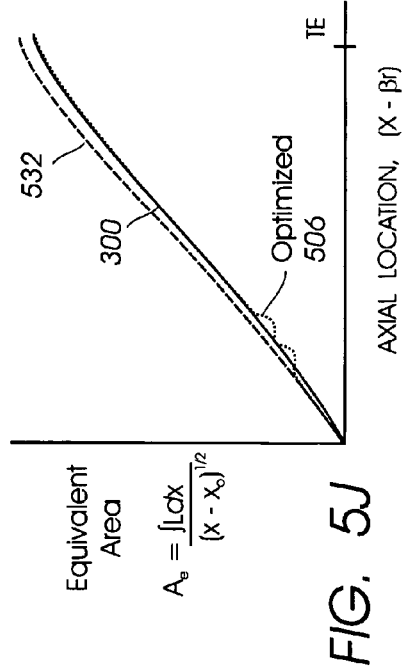
FIG. 5G
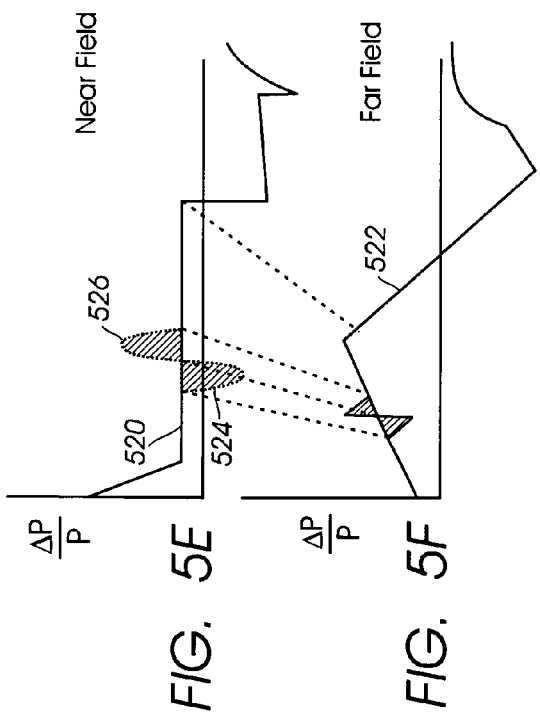
FIG. 5H
FIG. 5I
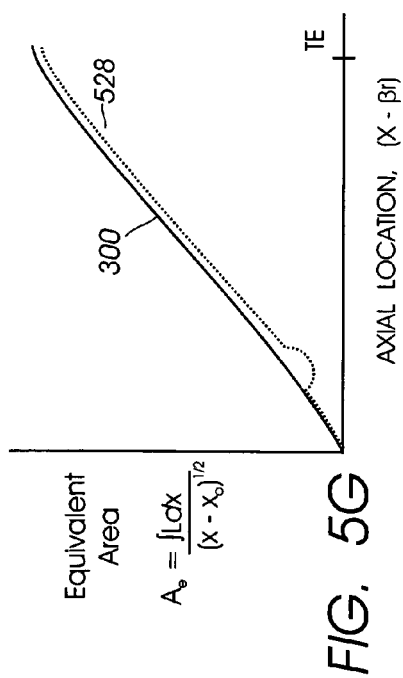
FIG. 5J

METHODS FOR CONFIGURING AIRCRAFT TO MEET PERFORMANCE GOALS AND SHOCK WAVE DISTURBANCE CONSTRAINTS

BACKGROUND OF THE INVENTION

Supersonic flight over the United States and other countries is a challenging environmental issue for a viable supersonic commercial aircraft. Current FAA regulations prohibit civil flights at Mach numbers greater than one without case-by-case exceptions approved by the Administrator. Many other countries have similar restrictions.

A sonic boom occurs due to pressure waves that occur when an aircraft moves at supersonic speeds. During subsonic flight, air displaced by a passing plane flows around the plane in the manner water flows around an object in a stream. However, for a plane flying at supersonic speeds, the air cannot easily flow around the plane and is instead compressed, generating a pressure pulse through the atmosphere. The pressure pulse intensity decreases as a consequence of movement from the airplane, and changes shape into an N-shaped wave within which pressure raises sharply, gradually declines, then rapidly returns to ambient atmospheric pressure. A wall of compressed air that moves at airplane speed spreads from the wave and, in passing over ground, is heard and felt as a sonic boom. The rapid changes in pressure at the beginning and end of the N-wave produce the signature double bang of the sonic boom. FIG. 1A shows a diagram of a N-wave signature 102 produced by a conventional supersonic aircraft. Sonic boom is reduced by controlling the pressure disturbance such that shock waves do not coalesce. The conventional N-wave 102 is replaced by a shaped sonic boom signature 104 as shown in FIG. 1B. Boom reduction makes a supersonic aircraft less objectionable by minimizing the loudness of a sonic boom.

Previous research has shown that the highly impulsive nature of the "N-wave" sonic-boom signatures of all existing supersonic aircraft is the primary cause of negative response and regulatory limitations on supersonic travel. Conclusions of NASA research further indicate the exceptional difficultly of designing an aircraft with an "N-wave" signature of sufficiently low amplitude for general public acceptance. However, the research also found that a "shaped" signature was less annoying and that a reasonably achievable amplitude wave could meet a 1995 CHABA (Committee on Hearing and Bioacoustics of the National Research Council) guideline for acceptable noise impact to the general public, depending on frequency of exposure.

Research has shown that boom intensity can be reduced by altering aircraft shape, size, and weight. For example, small airplanes create a smaller amplitude boom due to a lower amount of air displacement. Similarly, a lighter aircraft produces a smaller boom since an airplane rests on a column of compressed air and a lighter plane generates a lower pressure column (only N-waves). An aircraft that is long in proportion to weight spreads the pressure signature across a greater distance, resulting in a lower peak pressure. Furthermore, wings that are spread along the body and not concentrated in the center as in a conventional aircraft produce a pressure pulse that is similarly spread, resulting in a smaller sonic boom.

Shaping of a sonic boom refers to a technique of altering source pressure disturbance such that a non-N-wave shape is imposed on the ground. Shaping sonic boom can reduce loudness by 15-20 dB or more with no added energy beyond that to sustain flight. Shaping to minimize loudness is based on insight regarding changes in aircraft pressure disturbances during propagation to the ground.

The N-wave form generates the largest possible shock magnitude from a particular disturbance. The N-wave shape results because the front of a supersonic aircraft generates an increase in ambient pressure while the rear generates a decrease in pressure. Variation in propagation speed stretches the disturbance during propagation to the ground. Shaped boom techniques typically attempt to prevent coalescing of the pressure disturbance by adding a large compression at the aircraft nose and an expansion at the tail with pressure in between constrained between the compression and expansion. The shaped boom stretches the ends of the signature faster than the in-between pressures, creating a non-N-wave sonic boom at the ground.

In a technical paper entitled "Sonic-Boom Minimization" published in the Journal of the Acoustical Society of America, Vol. 51, No. 2, Pt. 3, February 1972, pp. 686-694, the authors A. R. George and Richard Seebass developed the theory for tailoring the area and lift distribution versus aircraft length to minimize the shock strength at the ground given parameters of aircraft weight, flight altitude and Mach number. To minimize the shock strength, the sum of the area and lift must exactly follow the George and Seebass distribution. In a publication entitled "Sonic-Boom Minimization with Nose Bluntness Relaxation," published as NASA TP-1348, 1979, Darden added a shape for a relaxed bluntness nose that reduced bluntness drag greatly with a slight increase in boom. In contrast with intuition, the near-field pressure distribution 106 (FIG. 1B) requires a strong leading edge compression that quickly reduces in magnitude, followed by a gradually increasing weak compression that rapidly inverts into a weak expansion, followed by a stronger trailing edge expansion that gradually recompresses to ambient.

Aircraft configured according to George-Seebass-Darden's theory for shock minimized distributions are impractical designs because the distributions require:

1. either blunt noses or relaxed bluntness noses whose shapes result in higher drag than minimum drag shapes, which lead to reduced performance;
2. smooth distributions through the engine nacelle region, which is not possible with existing engine designs;
3. a one-dimensional simplifying assumption so the distributions are only calculated directly under the vehicle, which means that non-planar and azimuthally varying effects are not considered; and
4. an expansion behind the aft end of the vehicle to keep the aft shock from coalescing, contrary to a minimum wave drag shape which compresses the flow field for about the last quarter of the vehicle's length.

Additional techniques are therefore desired to reduce sonic boom disturbances generated by a realistic vehicle.

Achieving a minimized equivalent area distribution is difficult because any change in the area or lift distributions impacts so many other vehicle requirements. It is extremely computationally intensive to arrive at a design that meets all the constraints and requirements with optimum performance.

SUMMARY OF THE INVENTION

What is desired is a method, system, and apparatus with a surface configured to redistribute forces acting on one or more surfaces to minimize shock wave disturbance as well as other constraints that may be placed on the performance or configuration of the apparatus. Surfaces of the apparatus are configured with one or more areas of expansion that are balanced by one or more areas of compression to redistribute forces acting on the surface.

In accordance with some embodiments, a method for configuring an aircraft for low sonic boom supersonic flight conditions includes scaling an equivalent area distribution goal curve to approximate an ideal equivalent area distribution goal curve. A design constraint requiring the equivalent area distribution curve of the aircraft to be at the goal curve can be relaxed to allow the equivalent area distribution curve to be at or below the equivalent area distribution goal curve.

According to other embodiments, an aircraft includes a wing configured to generate a first area of expanded airflow and a first area of compressed airflow following the area of expanded airflow. The areas of expansion and compression are configured to be at or below an equivalent area distribution goal that minimizes sonic boom disturbance by redistributing areas of lift on the wing. The reduced lift generated by the area of expansion is balanced by the additional lift generated by the area of compression.

In additional embodiments, an aircraft design system includes logic instructions operable to redistribute lift of a wing by configuring the wing with areas of far-field expansion ahead of areas of far-field compression. The system also allows an equivalent area distribution goal curve to be scaled to maintain the desired aircraft weight while countering excursions below the equivalent area distribution goal curve.

BRIEF DESCRIPTION OF THE DRAWINGS

Embodiments of the invention relating to both structure and method of operation, may best be understood by referring to the following description and accompanying drawings.

FIGS. 5E and 5F show an example of near field and corresponding far-field F-functions with balanced expansion and compression lobes;

FIG. 5G indicates how the technique of simply balancing an expansion lobe with a corresponding compression lobe of an F-function results in an equivalent area distribution that falls short of equivalent area distribution goal;

FIGS. 5H-5J, illustrate generating a larger expansion by scaling equivalent area distribution goal to a higher weight to meet the equivalent area distribution goal;

DETAILED DESCRIPTION OF THE EMBODIMENTS

Figure 1:
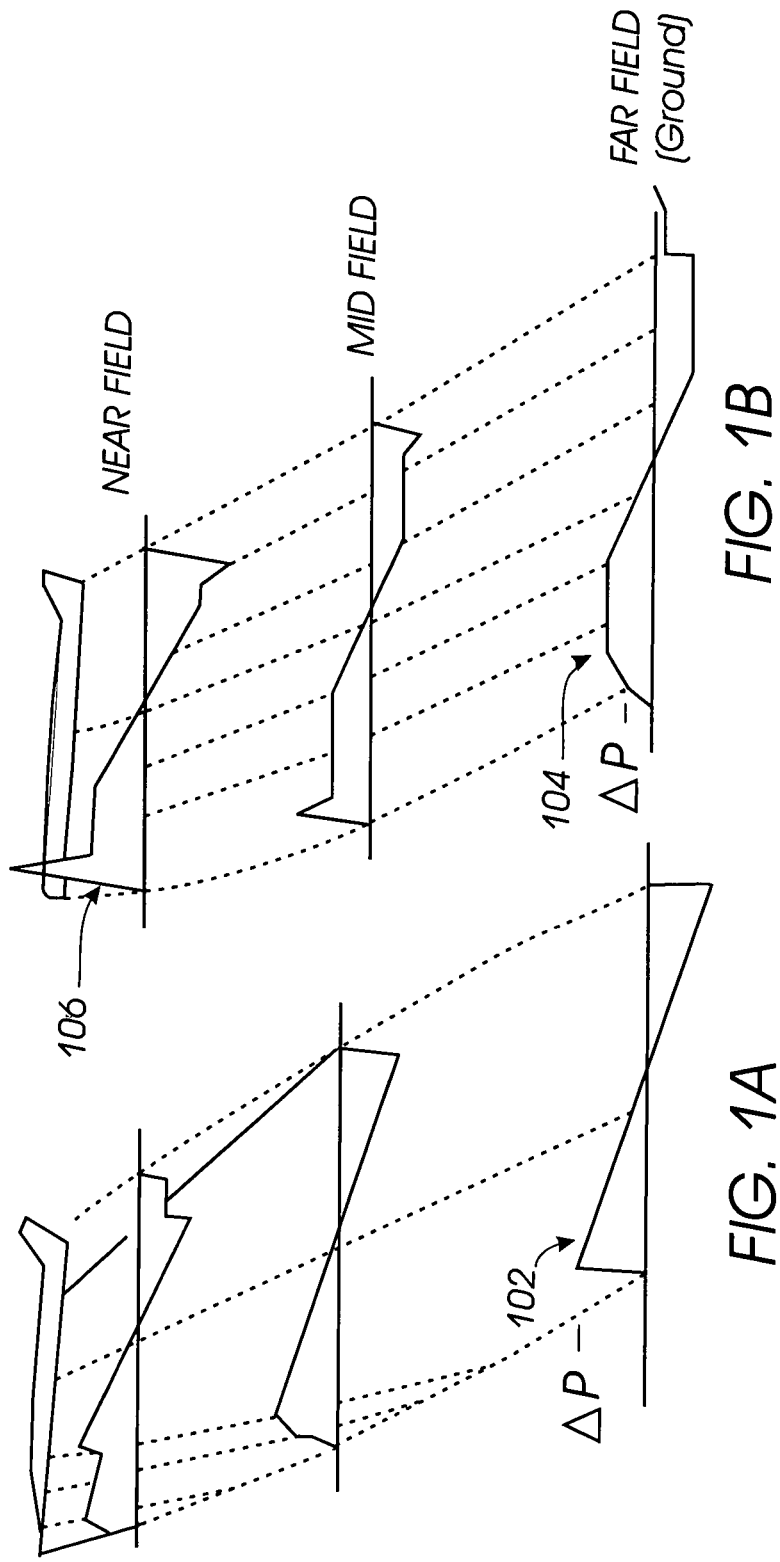
FIG. 1A illustrates an N-shaped sonic boom profile for a conventional aircraft.
FIG. 1B illustrates a sonic boom profile shaped for lower pressure disturbances than the profile in FIG. 1A.
Figure 2:
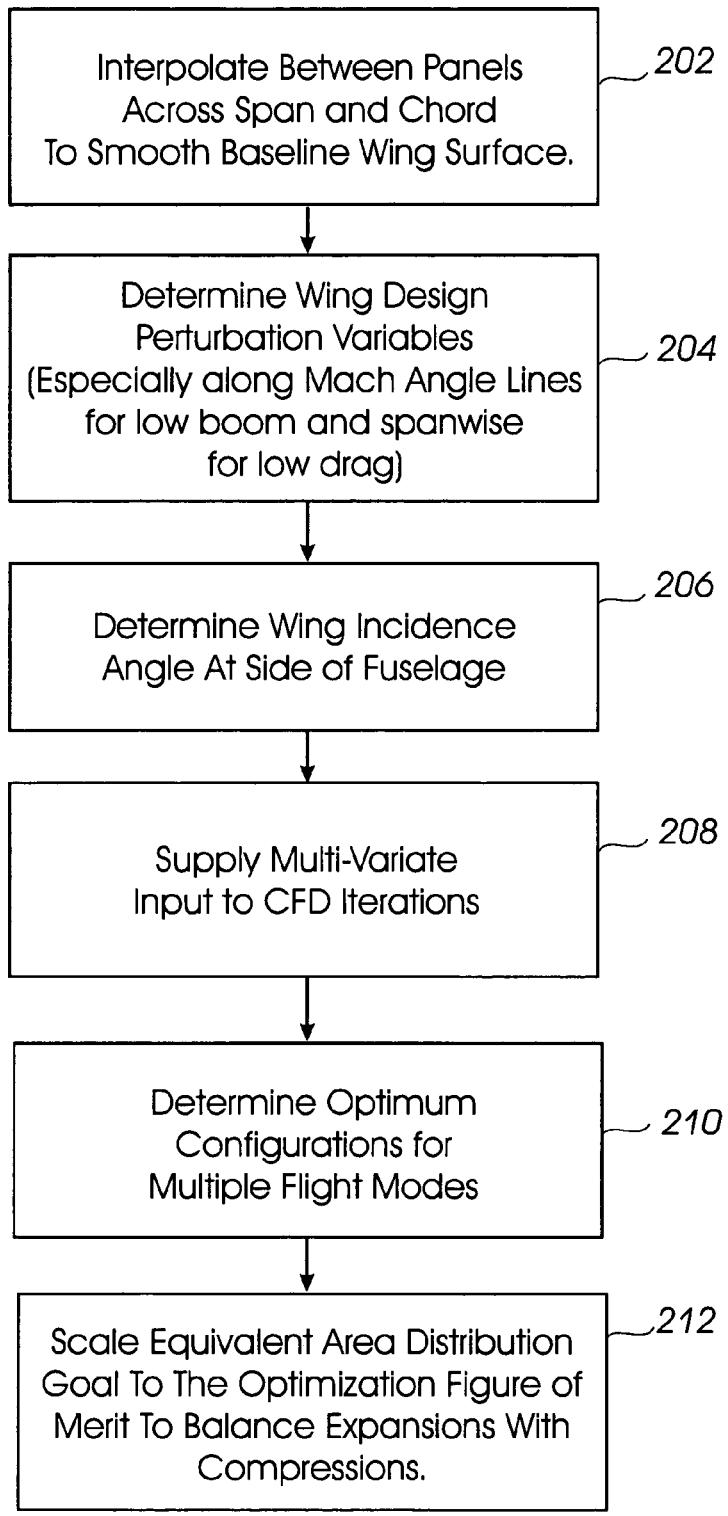
FIG. 2 shows an embodiment of a flow diagram of processes that provide capabilities to design aircraft with low drag (high performance) and reduced sonic boom capabilities.

Shaped sonic boom signatures 104 (FIG. 1B) are achieved by tailoring the volume and lift distribution of an aircraft. In addition to low sonic boom capabilities, a commercially viable supersonic aircraft must have low drag to achieve range, fuel efficiency, and payload goals. FIG. 2 shows an embodiment of a flow diagram of processes 202 through 212 that provide capabilities to design aircraft with low drag (high performance) and reduced sonic boom capabilities.

Figure 3A:
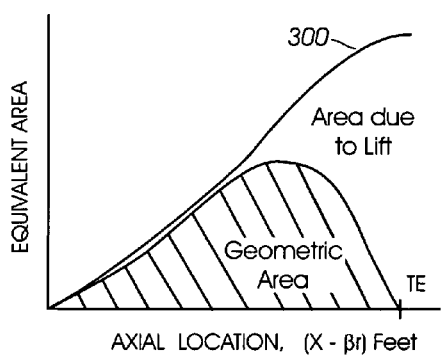
FIG. 3A shows a constraint curve of a goal equivalent area distribution for minimizing sonic boom disturbances.

Part of the theoretical background for processes 202 through 212 is based on the George-Seebass-Darden theory, which requires the pressure disturbance caused by a low boom aircraft to follow an inversely calculated equivalent area distribution goal 300 to result in the lowest shock strength at the ground. As shown in FIG. 3A, when the equivalent area due to geometric area and lift sum to the equivalent area distribution goal 300, a minimized ground sonic boom is expected. Equivalent area is the Mach angle area distribution of an axisymmetric body that generates the same disturbance as a given geometric area or given lift distribution. The volume contribution is that due to a body of revolution whose cross-sectional area equals that of the cross section of the aircraft cut at a Mach cone angle, for the roll angle of interest, projected onto the plane perpendicular to the freestream.

Figure 3B:
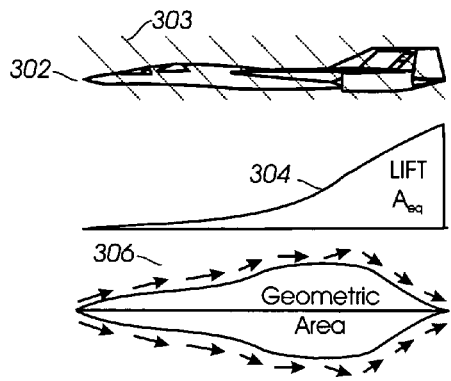
FIG. 3B shows an example of Mach angle lines superimposed on aircraft along which equivalent geometric area and area due to lift can be determined.

FIG. 3B shows an example of Mach angle dashed lines 303 superimposed on aircraft 302 along which equivalent area can be determined, for drag and sonic boom directly below the vehicle. FIG. 3B also shows a curve of equivalent area due to lift 304, which is proportional to the integral of the Mach angle lift per unit of streamwise length times the square root of distance. A curve of equivalent area due to geometric area 306 in FIG. 3B can be approximated as being equal to the cross-sectional area distribution along Mach angle.

Sonic boom minimization can still be achieved if an aircraft's equivalent area distribution has excursions below the George-Seebass-Darden equivalent area distribution goal 300. The George-Seebass-Darden constraint can thus be relaxed to allow the equivalent area distribution of the aircraft to be equal to or less than the equivalent area distribution goal 300 to achieve minimized sonic boom at the ground.

Processes 202 through 212 rely on a more feasible, relaxed George-Seebass-Darden constraint, which allows realistic supersonic aircraft with optimum performance to be designed more quickly than previously possible. A relaxed constraint of allowing the equivalent area distribution of the aircraft to be at or below the equivalent area distribution goal curve enables multiple parameters to be configured to meet the constraint, thus providing designers with greater freedom to adjust the design configuration to meet performance objectives.

Figure 3C:
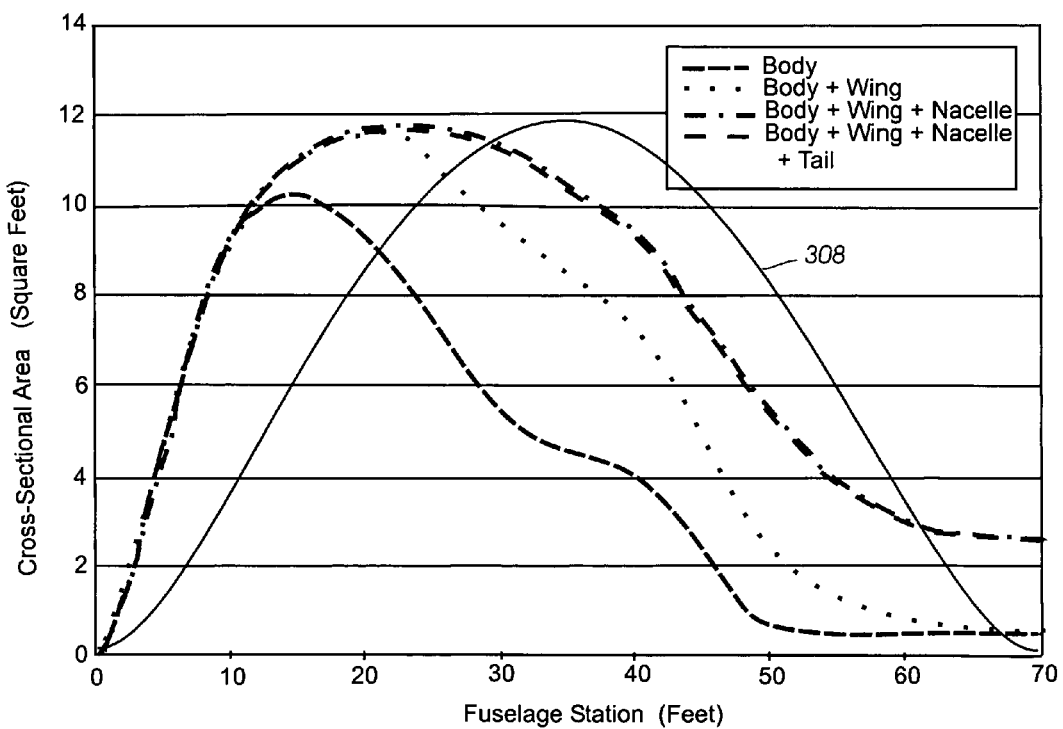
FIG. 3C shows the difference in cross-sectional area for components of an example of an aircraft body versus the ideal Sears-Haack conceptual body shape for minimizing wave drag.

Another aspect of the theoretical background for processes 202 through 212 relies on reducing wave drag by reducing changes in the aircraft's cross-sectional area, and minimizing the maximum cross-sectional area of the aircraft. To reduce the wave drag due to change in cross-sectional area, the area must follow a smooth bell curve shape known as a Sears-Haack curve 308 shown in FIG. 3C. FIG. 3C also shows the difference in cross-sectional area for components of an example of an aircraft body versus the Sears-Haack conceptual body shape. The closer the cross-sectional area distribution smoothness (or more specifically, the integral of the second derivative of area) comes to the ideal Sears-Haack curve 308, the lower the wave drag. A smooth overall vehicle cross-sectional area with a wasp-waisted fuselage in the vicinity of the wing is more significant in reducing wave drag than a smooth fuselage that results in the overall area being unsmooth. For drag and boom minimization, the component areas and lifts are carefully integrated to reach the desired overall distributions. The arrows around geometric area curve 306 of FIG. 3B indicate the direction of change in overall geometric area, which should be minimized for low wave drag.

In determining the overall shape of the wing for a low boom supersonic aircraft, both the George-Seebass-Darden constraint, and the Sears-Haack ideal body constraint are utilized. Once a desirable lift and area distribution is developed, aircraft parameters, such as: nose bluntness, wing incidence angle, twist, taper, camber, and thickness, among others, that are required to achieve this distribution are determined. Candidate wing parameters are typically analyzed using a panel or other CFD (computational fluid dynamics) method that divide the wing into a large number of rectangular or trapezoidal panels. The flow characteristics for each panel combine to form the aerodynamic characteristics of the wing.

There often are oscillations from panel to panel when using isentropic (and other) flow solutions; however, which results in a "crinkled" shape to the surface of the wing. One problem with the crinkled surface is the increased entropic drag that can be missed by the lower fidelity or lower resolution analyses needed for rapid design. Another undesirable characteristic is that the crinkled surface may buckle if any appreciable load is carried in the wing skin during flight. Thus, additional structure and attendant weight, such as wing spars, are required for the wings to carry the load of the aircraft. Smoothing oscillations in the initial design, spanwise along Mach angle lines and chordwise, before optimizing the design with the following procedures often makes for a better starting point.

Referring again to FIG. 2, in some embodiments, process 202 includes smoothly perturbing the surface of the baseline wing design by linearly interpolating perturbations in the slopes of the wing surface across the span and the chord of the wing. The linear interpolation results in a parabolic surface curve fit between panels. Applying only smooth perturbations to a smooth baseline wing can speed design convergence, lower drag and reduce structural weight, by allowing more load to be carried in the skin of the wing. Interconnecting a lattice of derivative design variables that proportionately affect pressure, such as slope or derivative of slope, allows the final design to become almost any shape. Additionally, using variables that interconnect smoothly can eliminate the need for any smoothing later.

Figure 4A:
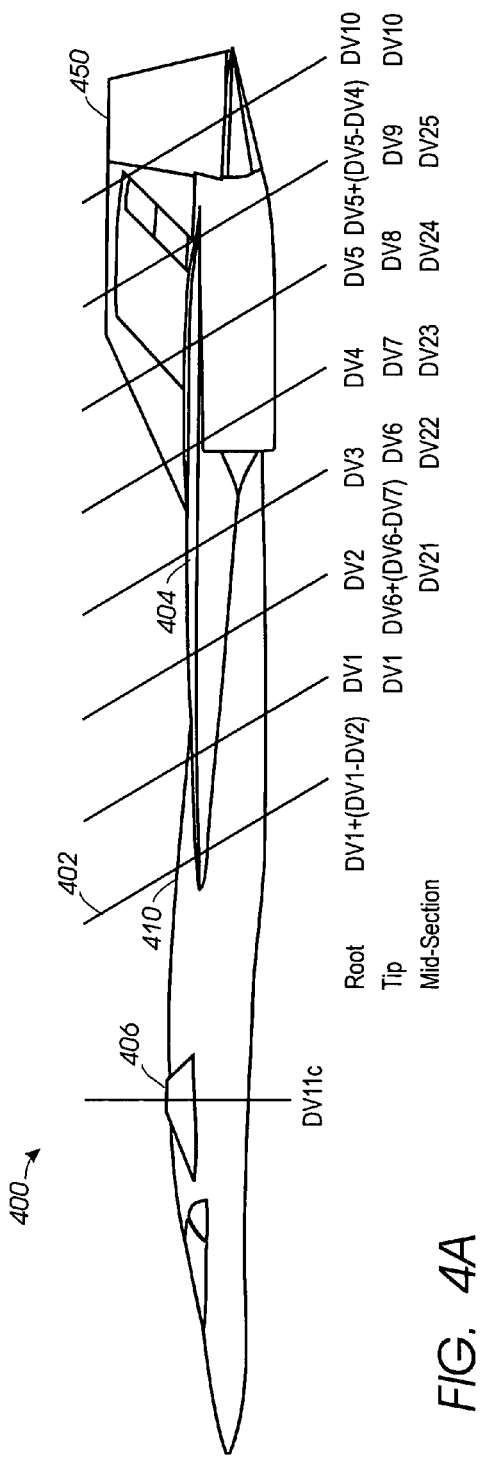
FIGS. 4A, 4B, and 4C are diagrams showing side, front, and top views of an embodiment of a supersonic aircraft that was designed utilizing the processes shown in FIG. 2.
Figure 4B:
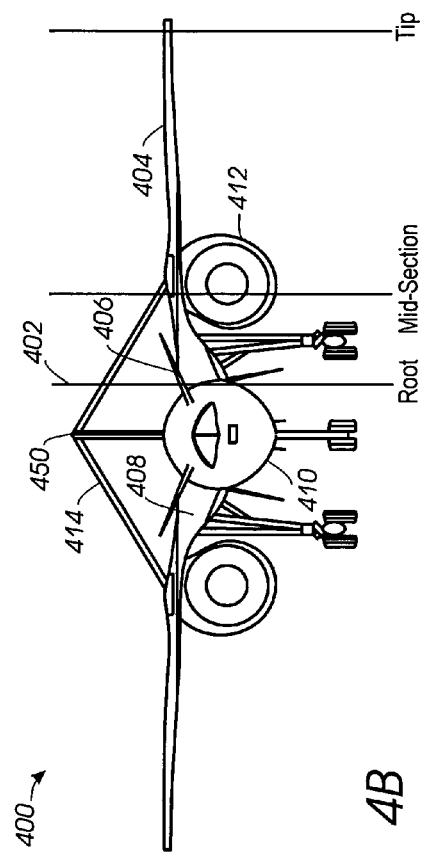
Figure 4C:
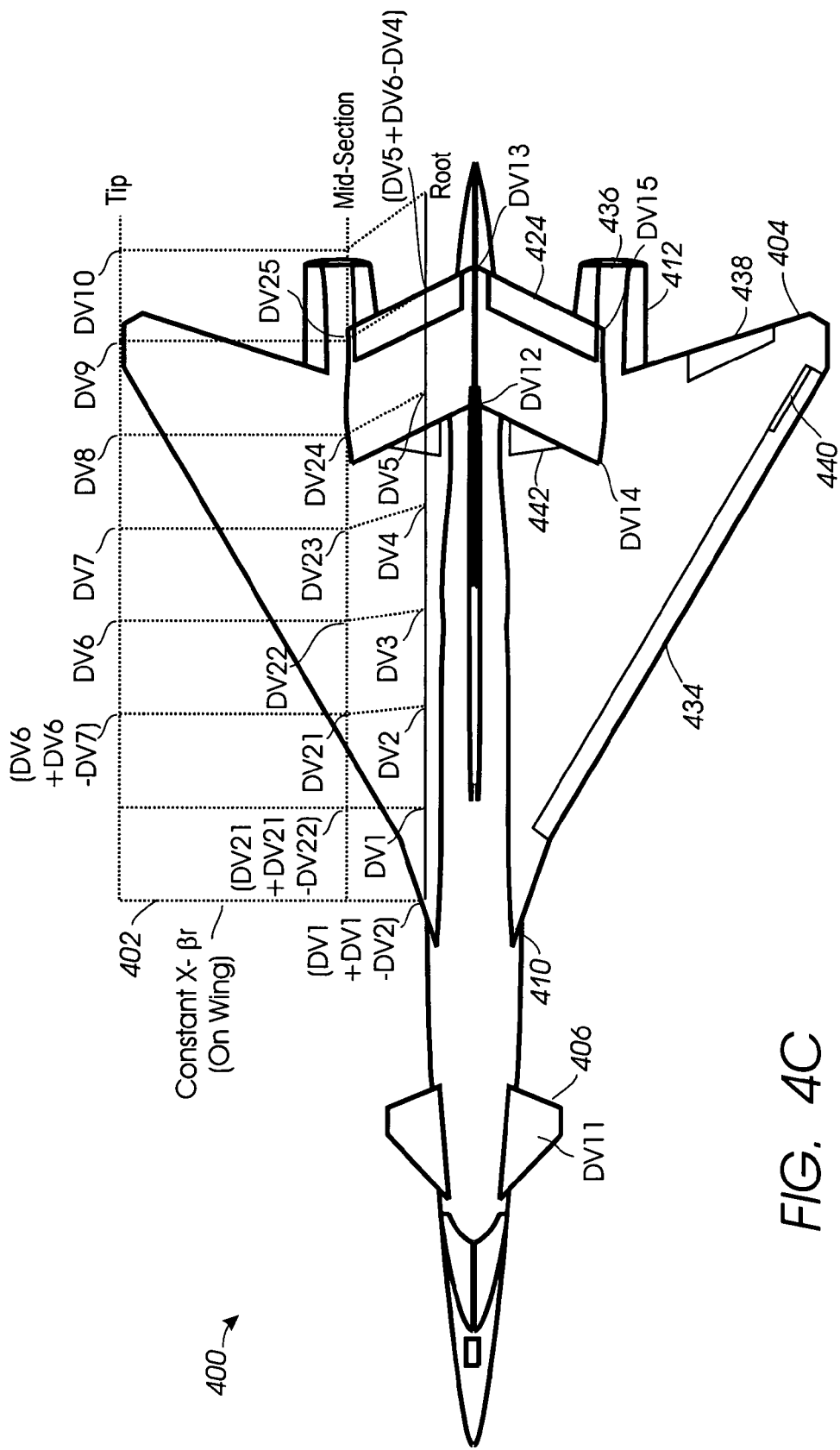

Process 204 includes determining locations of design variables (DVs) to use to perform constrained (such as less or equal to equivalent area distribution goal 300 for sonic boom minimization), and unconstrained optimization to minimize or maximize a specified figure of merit, such as lift-to-drag ratio and/or low sonic boom. FIGS. 4A through 4C show side, front, and top views, respectively, of aircraft 400 overlaid with Mach angle lines 402 across wing 404 and canard 406. Design variables are located at canard 406 and at the root, mid-section, and tip of wing 404. In some embodiments, canard 406 is desired to achieve a symmetrical airfoil cross-section and therefore requires only one design variable.

Each design variable can be a single value, or a range of values for a specified parameter. For example, in some embodiments, parameters such as camber, sweep angle, incidence angle, twist, and aspect ratio can be used to determine an optimum configuration given constraints such as low sonic boom, high lift-to-drag ratio, and center of pressure position that balances with the aircraft's center of gravity (with and/or without control surface trim).

Note that in some embodiments, aircraft 400 includes a gull dihedral region 408 at the aft inboard section of wing 404. Some of Mach angle lines 402 in the gull dihedral region 408 are progressively canted (shown in FIG. 4C) from a mid-section to the root of wing 404 to follow the upper surface of dihedral region 408. Mid-section design variables can be defined at appropriate locations along the span of wing 404, such as the end of dihedral region 408, where a configuration change occurs that can significantly affect the performance of wing 404.

In some embodiments, only the design variables at the root and tip of wing 404 are used. In other embodiments, mid-section design variables can be included to redesign wing 404. The use of mid-section variables reduces incidence limitations from side-of-body constraints due to fuselage 410 when analyzing outboard portions of wing 404. FIG. 4A shows a total of ten different design variables that cover fourteen positions at the root and tip of wing 404. If the mid-section design variables, such as DV21-DV25 are utilized, a total of fifteen design variables are used covering twenty-one positions. A greater or lesser number of design variables may be utilized at the same and/or different locations, depending on the geometry of a specific configuration.

Referring to FIGS. 2 and 4A, process 206 includes determining an optimum angle of incidence at different stations along wing 404 given the constraints of: fuselage 410, low sonic boom, high lift-to-drag, and the center of pressure located in a position that can be balanced with the aircraft's center of gravity. When designing wing 404 for a high lift-to-drag constraint alone, an optimization algorithm will typically configure a higher incidence angle at the root than the tip of wing 404. Lower wing incidence angles increase the angle of attack required during flight, compressing the volume of the vehicle; therefore, sonic boom constrained designs tend toward higher wing incidence angles.

When configuring aircraft 400 to meet both high lift-to-drag and low sonic boom constraints, the incidence of wing 404 at the root can be constrained so that the position of the wing allows the wing to be connected to the fuselage. The optimization process can increase the outboard angles of incidence to maintain a lower angle of attack. Thus, process 206 can include constraining the incidence of the inboard section of wing 404 to match a fixed fuselage camber or include fuselage camber design variables that are included in the wing root design variables such that connection between the wing 404 and the fuselage 410 is maintained throughout perturbations.

The side of fuselage constraint specifies parameters required for an acceptable configuration, such as, for example, passenger cabin floor angle, stowed landing gear clearance within the fuselage, tail clearance during takeoff rotation, and cockpit visibility. Often the fuselage incidence always tends toward the constraint maximum. To more efficiently constrain a fixed incidence angle, another set of design variables (DV1A through DV5A) can be used that are derived from the root design variables (DV1 through DV5), with the sum of the DV1A through DV5A being equal to zero as shown, for example, in Tables 1 through 3. Using these derived variables allows perturbations to be made that change the distribution of lift without changing the incidence.

TABLE 1

Example of Side of Fuselage Constraints

| DV1 = .1 | DV2 = 0 | DV3 = 0 | DV4 = 0 | DV5 = 0 |
|---|---|---|---|---|
| DV1A = .1 | DV2A = −.025 | DV3A = −.025 | DV4A = −.025 | DV5A = −.025 |

TABLE 2

Example of Side of Fuselage Constraints

| DV1 = 0.1 | DV2 = 0 | DV3 = 0.1 | DV4 = 0 | DV5 = 0 |
|---|---|---|---|---|
| DV1A = .075 | DV2A = −.05 | DV3A = .075 | DV4A = −.05 | DV5A = −.05 |

TABLE 3

Example of Side of Fuselage Constraints

| DV1 = 0.1 | DV2 = 0 | DV3 = 0.2 | DV4 = 0 | DV5 = 0 |
|---|---|---|---|---|
| DV1A = .05 | DV2A = −.075 | DV3A = .175 | DV4A = −.075 | DV5A = −.075 |

Using DV1A through DV5A eliminates the necessity of adding constraints, which are computationally intensive and may not always converge to a solution. DV1A through DV5A eliminates these problems because constraints are always met in the selection of the design variables, which always sum to zero. Alternately, another single design variable could be added to all DV#As in the row, with limits that allow a variation in side-of-body incidence but maintain the position of the wing close enough to allow the wing to be joined to the fuselage.

For the planform shape example shown, the first design variable (DV1) is important because the lift generated by the leading edge affects lift across the entire wing 404. Once an optimum wing configuration is achieved for high lift-to-drag, DV1 can be re-optimized for both high lift-to-drag and low sonic boom constraints. In some embodiments, two or more design variables can be combined to provide an intermediate design variable, thereby reducing the number of design variables that must be specified. For example, FIG. 4A shows combinations (which are extrapolations) of DV5+(DV5-DV4) and DV6+(DV6-DV7), instead of defining another design variable at the respective locations. This technique of extrapolating design variables can be especially efficient where there are few wing panels in the extrapolated region.

Referring now to FIGS. 2, and 4A-4C, process 208 includes providing multiple flight conditions at which to optimize aircraft 400. A single aircraft configuration typically will not be optimal for all flight conditions. In some situations, a designer is able to segregate portions of an aircraft's flight regime into distinct phases during which the aircraft can be reconfigured to achieve an optimum result for a given flight segment. For example, while it is desirable to reduce sonic boom disturbances over land, louder sonic booms can be tolerated over an ocean or large unpopulated land mass. Sonic boom constraints are easier to meet at slower speed, such as 1.5 Mach, versus 1.8 Mach for supersonic cruise. Accordingly, a designer can determine a first configuration that meets sonic boom constraints during climb and cruise flight over land, another configuration that optimizes range during cruise flight over unpopulated areas with relaxed sonic boom constraints, as well as other configurations that optimize specified parameters during a particular flight segment. An optimum configuration can also be determined from a weighting of figures-of-merit from different flight segments.

For example, the equivalent area of an aircraft designed for low sonic boom disturbances carries as much lift as possible at the aft end of the aircraft to meet the George-Seebass-Darden equivalent area distribution goal 300 (FIG. 3A). For weight and balance purposes, the center of lift must be positioned relative to the aircraft's center of gravity to allow the aircraft to meet specified stability and control characteristics. Accordingly, low-boom supersonic aircraft 400 includes relatively lightweight cabin space positioned as far forward as possible; delta wings, tail lifting surfaces (inverted V-tail), and heavy components such as engines, positioned as far aft as possible. The aircraft's active components, such as a fuel re-distribution system and movable control surfaces, can be adjusted during flight to optimize other parameters, such as range and speed, in addition to, or instead of, low sonic boom.

A control system can be used in aircraft 400 that manages control surfaces, and actively re-distributes fuel in wings 404 and/or fuselage 410 to control the center of gravity. Control surfaces can include canards 406, an inverted V-tail with ruddervators, ailerons, high speed spoilers, and rudder, for example. Sensors indicate control surface positions and flight conditions. The control system can manage the control surfaces and transfer fuel among the fuel tanks to adjust aircraft trim and center of gravity position to operate the aircraft 400 in different flight modes.

In a maximum range, maximum speed mode, the active control surfaces are typically trimmed for relatively reduced trim drag and the fuel is distributed to position the center of gravity relatively forward. In a low sonic boom mode, the control system typically configures aircraft 400 for slightly reduced range, relatively lower Mach number with control surfaces positioned for a slight increase in trim drag and fuel distributed to position the center of gravity relatively aft. In some embodiments, the fuel in the forward-most tanks is consumed first to attain cruise condition at a maximum aft center-of-gravity when the initial segments of the flight are conducted over land with sonic boom constraints. Once the aircraft reaches a large unpopulated area, such as an ocean, the control system can reconfigure the aircraft's control surfaces and redistribute fuel if necessary for maximum range and speed, albeit with higher sonic boom disturbance.

Process 208 can also be used to help determine optimum configurations for takeoff, climb, and landing modes, based on the constraints to be met for each flight mode. The control system can be provided with configuration information to reconfigure aircraft 400 for different flight modes either automatically or in response to a pilot command. Accordingly, an aircraft that operates efficiently over flight conditions ranging from takeoff, climb, low boom climb and cruise, high speed cruise, and landing, can be provided.

One aspect of sonic boom minimization theory that is utilized in processes 208 and 210 involves balancing areas of expanded flow along wing 404 with areas of compressed flow. Additionally, sonic boom shocks become quieter with decreasing magnitude and with increasing rise time (of the pressure change). However, the shock rise time is inversely proportional to its magnitude (although there is a large variability around this relationship in measurements). Therefore, the audible sound pressure decreases dramatically with decreasing shock magnitude. For example, the noise from two shocks at half the pressure of a single shock is approximately 6 decibels lower, and the noise from one shock at half the pressure is about 9 decibels lower. Thus, minimizing shock magnitude minimizes the loudness of the sonic boom.

The lowest shock magnitude from a shaped sonic boom may be determined theoretically. Sonic boom minimization methodology calculates the minimum shock strength possible subject to a compression slope input for a given vehicle length and weight at the desired flight conditions. This is the lowest shock magnitude possible, assuming that any compression between the shocks have a constant, linear slope.

A given lift distribution can be converted into a corresponding equivalent area distribution using the following equation:

$$A_e = [\int L dx]/(x-x_o)^{1/2}$$

where: $A_e$=equivalent area
L=Lift per unit measurement
x=distance along longitudinal axis Equivalent area curves can be be used to calculate non-dimensionalized functions of the change in pressure divided by total pressure, also referred to as an F-function, along the effective length of the aircraft.

Figure 5A:
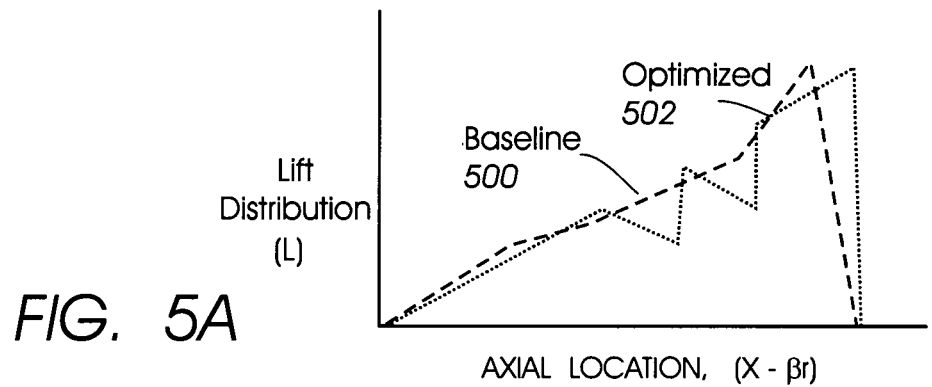
FIG. 5A shows an example of a baseline lift distribution curve overlaid with a sonic boom optimized lift distribution curve.
Figure 5B:
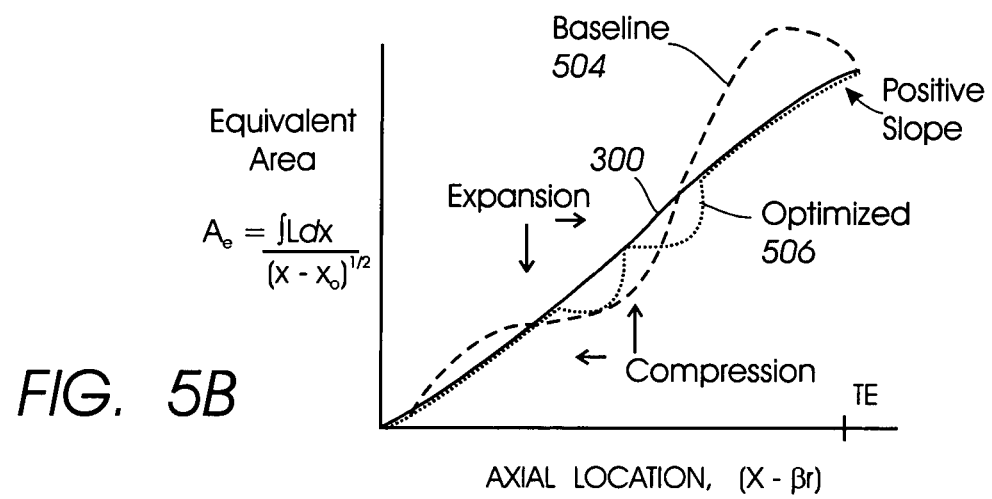
FIG. 5B shows equivalent area distributions that result from the baseline and optimized lift distribution curves, respectively.

Referring to FIGS. 2, and 5A-5G, FIG. 5A shows a baseline lift distribution curve 500 overlaid with sonic boom constrained lift distribution curve 502. Equivalent area distributions 504, 506 that result from the baseline and optimized lift distribution curves 500, 502, respectively, are shown in FIG. 5B. Note that sonic boom minimization is still achieved if an aircraft's equivalent area distribution has excursions below the George-Seebass-Darden equivalent area distribution goal 300. Thus, process 212 can include relaxing the George-Seebass-Darden constraint to allow the equivalent area distribution of the aircraft to be equal to or less than the equivalent area distribution goal 300 to achieve minimized sonic boom at the ground.

Figure 5C:
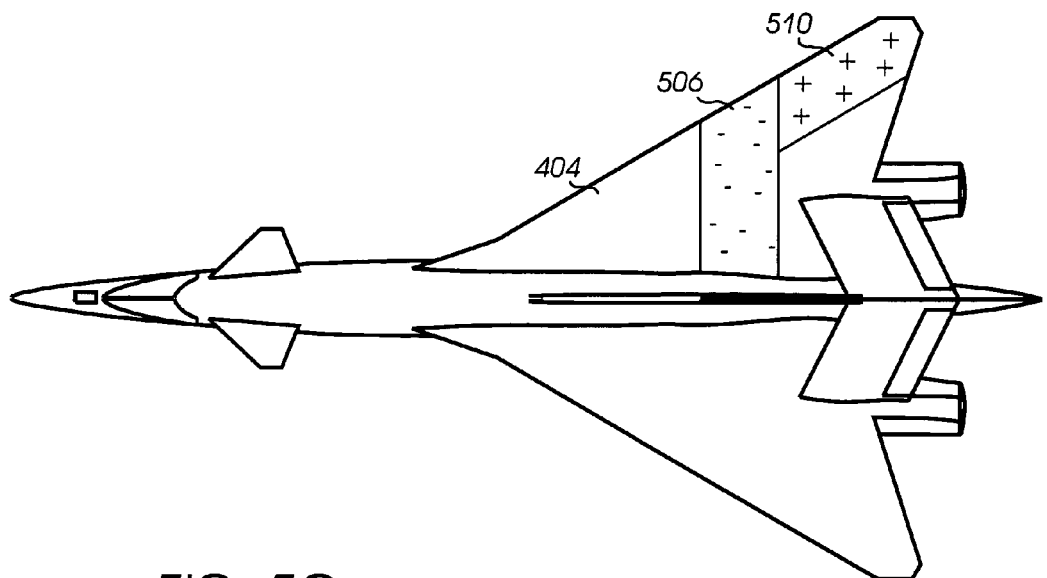
FIG. 5C shows a top view of an aircraft indicating an area of expanded (reduced lift) flow followed by an area of compressed (increased lift) flow.
Figure 5D:
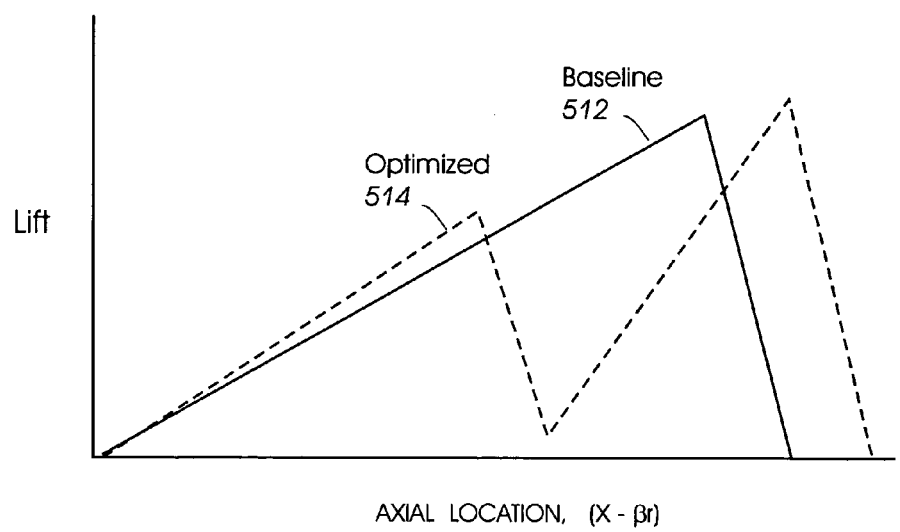
FIG. 5D shows a baseline lift distribution overlaid with a sonic boom optimized lift distribution that corresponds to the areas of expanded and compressed flow in FIG. 5C.

One way to take advantage of the ability to relax the George-Seebass-Darden constraint in process 212 can include redistributing lift on wing 404 (FIG. 4A) to achieve equivalent area distribution goal 300. For example, to achieve a positive slope at the trailing edge portion of equivalent area distribution goal 300, process 212 allows the designer to constrain various design variable parameters of wing 404 to redistribute lift from forward sections of wing 404 to more rearward wing sections. As an example, FIG. 5C shows a top view of aircraft 400 indicating an area of expanded (reduced lift) flow 508 followed by an area of compressed (increased lift) flow 510. FIG. 5D shows a baseline lift distribution 512 overlaid with a sonic boom optimized lift distribution 514 that corresponds to the areas of expanded and compressed flow 508, 510, respectively, in FIG. 5C.

FIGS. 5A and 5B show another example of lift redistribution between baseline and optimized lift distributions 500, 502, and corresponding equivalent area distributions 504, 506, respectively. Using process 212 to redistribute lift to achieve sonic boom constrained and lift-to-drag optimized lift distribution curve 502 results in an equivalent area curve 506 that is less than or equal to the equivalent area distribution goal 300, and meets the positive slope of equivalent area distribution goal 300 at the trailing edge (TE) of the aircraft. The less than or equal constraint required less perturbation of the wing and its lift distribution than exactly meeting goal equivalent area distribution 300, and the optimization shows it to be a higher lift-to-drag solution. Relaxing the constraint to be less than or equal to the equivalent area distribution goal 300 therefore provides designers with more flexibility in configuring an aircraft to meet both high lift-to-drag and low sonic boom requirements.

Another way of describing less than or equal to the equivalent area distribution goal 300 involves balancing compression areas 510 with expansion areas 508 located ahead of compression areas 510. One approach to balancing compression areas 510 with expansion areas 508 consists of requiring balanced lobes 508 of the corresponding F-function in the design optimization process. FIGS. 5E and 5F show an example of near field and corresponding far-field F-functions 520, 522 with balanced expansion and compression areas 524, 526 highlighted. This lobe-balancing technique is equivalent to producing a lobe having an excursion below an equivalent area goal, ahead of an excursion above the goal, that is large enough to cancel the excursion above. Note that F-functions 520, 522 are not drawn to scale.

A problem arises with calculating balanced lobes 524, 526 to meet the equivalent area distribution goal 300, however. The equivalent area distribution goal 300 can be derived from an F-function using the following equation:

$$A_e(x) = [(32 H)/(15 y_F)]x^{5/2} + H(x - y_F/2) + \ldots$$

If the F-function is perturbed by a finite amount $\delta F(y)$, then $$A_{eNew}(x) = A_e(x) + \delta A_e(x)$$

$$\delta A_e(x) = 4 \int \delta F(y)(x-y)^{1/2} dy$$

Where: $y_F = x - \beta r$
$\beta = (M^2 - 1)^{1/2}$
M=Mach Number
r—distance from longitudinal axis centerline
H=height of spike in F-function
x=distance along longitudinal axis The change in equivalent area ($\delta A_e(x)$) is thus proportional to the integral of the change in the F-function multiplied by the square root of the axial distance over which the change occurs minus the magnitude of the F-function. Thus, simply balancing expansion lobe 524 with corresponding compression lobe 526 results in an equivalent area distribution 528 that falls short of equivalent area distribution goal 300, as shown in FIG. 5G. This is due to the fact that the lobe balancing technique does not account for closer proximity of the compression and farther proximity of the expansion from the $(x-y)^{1/2}$ term as shown in the equation for $\delta A_e(x)$ above.

Referring to FIGS. 2, and 5H-5J, in order to overcome the disadvantages of lobe balancing, process 212 includes scaling equivalent area distribution goal 300 to a higher weight, as represented by equivalent area distribution goal 532 in FIG. 5J. Scaling the equivalent area distribution goal 300 to a higher weight causes the aircraft to be configured at the desired aircraft weight even after returning from excursions below the equivalent area distribution goal 300. Thus, using scaled equivalent area distribution goal 532 causes the equivalent area distribution 506 of the aircraft to more closely approximate equivalent area distribution goal 300.

The scale factor applied to equivalent area distribution goal 300 is proportional to the difference between inverse of the square root of the distances over which the expansion and compression occur. Instead of calculating the scale factor, a scale factor of 1.1 can be applied to equivalent area distribution 300. The scale factor can then be adjusted, if necessary, to bring equivalent area distribution 506 as close as possible to equivalent area distribution 300. Note that the F-functions shown in FIGS. 5H and 5I are not drawn to scale.

Figure 5K:
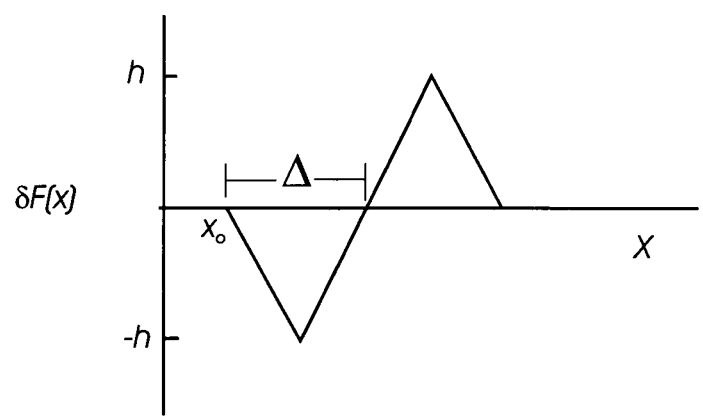
FIG. 5K shows a diagram of an exemplary perturbation function.

Process 212 can also include determining and limiting the magnitude of intermediate shocks 536 that can be tolerated using the F-function at ground level, such as shown in FIG. 5I. The ground strength depends on the length over which an excursion below the goal occurs; however, it is independent of the magnitude of the excursion. To limit intermediate shock magnitude at the ground, the length of excursions (in terms of (X−Beta*R)) are broken into segments no longer than the shock magnitude desired. Once the magnitude of intermediate shocks 536 is determined, process 212 determines the corresponding number and "length" of expansions 530 and compressions 534 required to remain within the desired audible level for the sonic boom. For example, assuming that the perturbation function is triangular as shown in FIG. 5K, and that $\Delta \ll (x-x_o)$, then $$\delta A_e(x) \approx [(2h)/(x-x_o)](3\Delta-2x_o)-3h\Delta(x-x_o)^{1/2}$$

where: $\Delta$=distance of perturbation along x-axis
h=magnitude of the perturbation Referring again to FIG. 2, processes 202 through 212 can be iterated until all of the constraints have been met. In some situations, a subset of processes 202 through 212 can be iterated to closure before proceeding on to the other processes. Additionally, once all of processes 202 through 212 have been executed, it may be necessary to loop through the processes again to meet all of the specified constraints.

Figure 6:
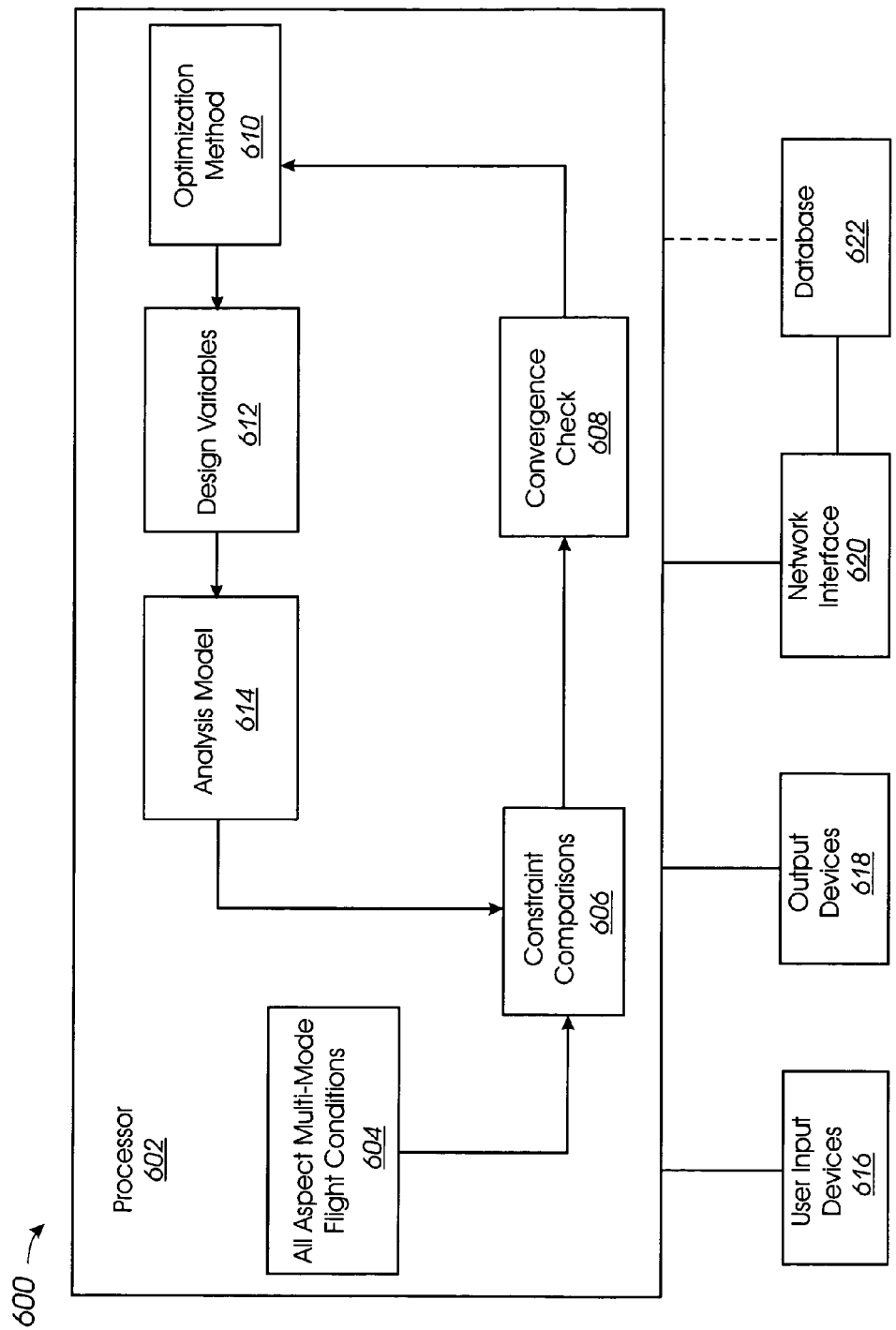
FIG. 6 shows a diagram of an embodiment of an interactive aircraft design system.

Referring now to FIGS. 2 and 6, FIG. 6 shows a diagram of an embodiment of an interactive aircraft design system 600 that allows the user to supply multiple flight modes at all aspects around aircraft 400. Aircraft design system 600 includes logic instructions that implement at least some of functions of processes 202 through 212.

Logic instructions are executed in computer processor 602 for various functions such as input all aspect, multi-point goals and constraints instructions 604; constraint comparison instructions 606; convergence check instructions 608; optimization method 610; set design variables instructions; and analysis model 614. Note that in other embodiments, additional sets of instructions can be performed by computer processor 602 in addition to, or instead of, instructions shown in FIG. 6.

Input all aspect, multi-point goals and constraints instructions 604 receives input from users regarding the different flight modes at which the aircraft configuration will be optimized. For example, modes such as takeoff, climb, low sonic boom mode at Mach 1.5, and high speed cruise mode at Mach 1.8 can be entered for analysis. The results of system 600 can include different settings for control surfaces and other reconfigurable aspects of the aircraft, as well as optimize the shape of fixed components such as wing camber, fuselage shape, wing shape, and engine nacelle position, flows and shape, among others. In addition to various flight modes, the user may also enter different aspect angles at which to analyze and optimize the aircraft's configuration. For example, while a particular aircraft configuration may meet low sonic boom goals directly under the aircraft during flight, the sonic boom disturbance generated to the sides of the aircraft may be objectionable. Therefore, the user can enter different flight modes as well as the distance/angle from centerline at which the sonic boom disturbance will be analyzed to determine the aircraft's configuration during various flight modes.

Constraint comparison instructions 606 receives input from all aspect, multi-point goals and constraints instructions 604 and analysis model 614. The geometry and performance of one or more configurations is compared to the constraints, such as lift-to-drag ratio, sonic boom, and geometry constraints. Convergence check instructions 608 receive the constraint comparisons and determine whether a solution has converged to meet all of the desired constraints. If all the constraints have not been met, convergence check instructions 608 determine the next perturbation on the design variables to impose to meet constraints, and invoke optimization method 610.

Optimization method 610 proceeds through iterative changes to the geometry and perturbations that, for example, optimize a defined cost function (e.g. drag) while satisfying geometric and aerodynamic constraints (e.g. fuel volume, cruise lift coefficient). Configurations can be optimized for single or multiple conditions. Target pressure distributions can be specified for inverse design, or as a constraint during optimization of other parameters that affect performance. Any suitable optimization method can be utilized, including one or a combination of methods.

Set design variables instructions 612 allow the user to specify locations on the aircraft's geometry, parameters at each location, and perturbation values for each parameter. The perturbations values can be single values, or a range of values, for each parameter.

Analysis model 614 analyzes the performance of candidate configurations using a suitable analysis method, such as computational fluid analysis (CFD), and provides performance results to constraint comparison instructions 606. The analysis can include performance in areas such as lift-to-drag ratios, sonic boom characteristics, and equivalent area distribution, among others. Any suitable analysis program or set of programs can be utilized. The complete iterative design process for performance optimization, geometry shaping and CFD analysis may be automated. In some embodiments, a designer can implement a design tool, such as a spreadsheet to provide input to various components such as all-aspect, multi-mode flight conditions 604 and design variables 612.

The logic instructions can be implemented as software programs and distributed over an information network or suitable computer-readable media as a software application program that can be installed on a personal computer, a centralized server, or other suitable computer system. The logic instructions can also be implemented in hardware, firmware, and/or a combination of hardware, firmware and software. One or more user input devices 616 can be provided, such as a keyboard, mouse, light pen, or a component such as a disk drive that can read data input files from a disk, to enable a designer to enter suitable constraints and design parameters. One or more output devices 618 such as a display device, printer, plotter, or other suitable output device can be coupled to receive information from processor 602. A user interface can also be included that provides instructions for using system 600, possible design parameters that can be varied, as well as assistance in interpreting the results. The results can be formatted and output for use in other design systems, such as computer-aided design and drawing systems via network interface 620, to easily share the results of the design effort. Processor 602 can be configured to access a database 622 either directly or via network interface 620 for mass data storage and retrieval.

Examples of software packages that are suitable for use in portions of design system 600 and commercially available include CFD++ from Metacomp Technologies, Inc. in Aurora, Calif.; Hypermesh from Altair Engineering in Troy, Mich.; RCD from Phoenix Integration Inc.; and SYN88MB from the Aerospace Computing Laboratory at Stanford University in Palo Alto, Calif. Other suitable programs can be utilized.

Referring again to FIGS. 4A through 4C, the embodiment of aircraft 400 shown is configured to achieve a low sonic boom signature while maintaining long supersonic range. Wings 404 includes gull dihedral portions 408 with inboard dihedral primarily at the trailing edges while maintaining straight inboard wing sections forward of the trailing edge dihedral. Gull dihedral portions 408 are configured to extend lifting length and reduce sonic boom effects. Gull dihedral portions 408 can be configured by adjusting the twist and camber of wings 404 to produce low-boom and low induced drag.

In some examples, aircraft 400 has twin non-afterburning turbofan engines (not shown) set below and behind wings 404. The non-afterburning turbofan engines operate behind fixed-geometry axisymmetric external compression inlets. Nacelles 412 enclose the engines and are coupled to the lower surface of wings 404.

In some embodiments, aircraft 400 includes an inverted V-tail 414 that generates additional aft lift to improve aerodynamics and reduce sonic boom disturbances during cruise flight conditions, as well as providing structural support for wings 404 and engine nacelles 412. Supersonic aircraft 400 creates a shaped pressure wave caused by overpressure at nose 404 and underpressure at tail 406. Pressure rises rapidly at nose 404, declines to an underpressure condition at tail 406, and then returns to ambient pressure.

The shape of supersonic aircraft 400, including aspects of wing 404, V-tail 414, and a reflexed airfoil portion (not shown) integrated with engine nacelle 412, are adapted according to sonic boom signature and supersonic cruise drag considerations. In some embodiments, a portion of nose 404 can be blunted to create a pressure spike ahead of the aircraft forward shock, which raises local temperature and sound velocity, thereby extending the forward shock and slowing the pressure rise. Wings 404 can have a sharply swept delta configuration that reduces peak overpressure by spreading wing lift along the length of aircraft 400. Wings 404 can also include reduced leading and trailing edge sweeps. Inverted V-tail control surfaces, termed ruddervators 424, adjust aircraft longitudinal lift distribution throughout the flight envelope to maintain a low boom, low drag trim condition.

In some embodiments, the leading edges of wings 404 have a substantially straight geometry to accommodate Krueger flaps 434 that extend substantially the full length of wings 404. Wings 404 integrate with nacelles 412 and diverters 436, and follow the fuselage contour with a substantially normal intersection to reduce interference drag. An inboard wing flap hinge line is fully contained within the wing contour with upper and lower wing surfaces configured as planar as possible to facilitate aerodynamic performance.

Gull dihedral portions 408 raise the engines to increase available tip-back angle and reduce thrust-induced pitching moments. Gull dihedral portions 412 lower fuselage 410 to reduce the cabin door height above the ground and reduce entry stair length. Fuselage 410 sets a low aircraft center of gravity, reducing tip-over angle and promoting ground stability. Gull dihedral portions 408 form partial shrouds around nacelles 412, enhancing favorable interaction between nacelles 412 and wings 404. In addition, gull dihedral portions 408 enhance the aircraft low-boom signature by vertically staggering the longitudinal lift distribution of wings 404.

In some embodiments, supersonic aircraft 400 can include canards 406 on both sides of fuselage 410 that operate primarily as longitudinal power control devices, particularly during takeoff and high-speed flight. Canards 406 also fine tune the aircraft longitudinal trim condition and augment rudder operation by supplying yaw control power when canards 406 are deflected differentially.

Supersonic aircraft 400 further includes segmented ailerons 438 that supply roll control power and automatic wing camber control to improve lift and drag conditions through the flight envelope. High-speed spoilers 440 supplement aileron roll power at transonic and supersonic speeds where Mach and aeroelastic effects reduce aileron effectiveness. Supersonic aircraft 400 has a high lift system including inboard trailing edge flaps 442 and full-wingspan leading edge Krueger flaps 434.

Canards 406 and symmetric deflections of the ruddervators 424 control pitch power. Rudder 450 controls yaw. Inboard, mid-board and outboard ailerons 438, and high speed spoilers 440 control roll at both subsonic and supersonic speeds. In an illustrative embodiment, trailing edge (TE) flaps 442 are deployed 30° down to generate additional lift during landing. TE flap deployment reduces angle-of-attack by approximately 220 during landing. During second-segment climb, the TE flaps 442 can be extended up to 40° to improve the lift-to-drag ratio for better climb performance.

Leading edge (LE) Krueger flaps 434 can be extended up to 130° for low speed operations including takeoff, approach and landing. The LE Krueger flaps 434 can improve lift-to-drag ratio by 1.5, resulting in better climb performance that facilitates second-segment climb in case of engine malfunction.

Some of the control surfaces on supersonic aircraft 400 can perform multiple functions. For example, ruddervators 442 enable continued operation and landing following single actuator failure or jammed control surface. Differential deflection of canards 406 can generate a yawing moment to counter a jammed rudder 450. Ailerons 438 and ruddervators 424 include multiple surfaces, increasing fault tolerant capability and supplying redundant control elements for improved reliability.

In addition to providing a system and method for configuring aircraft to meet sonic boom disturbance and lift-to-drag constraints, system 600 and processes 202 through 212 can be adapted to redistribute forces on any type of apparatus that includes surfaces subject to some sort of flow. For example, aquatic vehicles used on the surface and/or underneath water can be analyzed and configured with smooth surfaces that are shaped to generate areas of expansion that are balanced by areas of compression to redistribute the forces that are acting on the surface while optimizing one or more constraints. Additionally, a surface can include multiple areas configured to expand and compress airflow. One or more areas of expanded flow on different portions of the surface can be balanced by a single area of compression and vice versa.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed is:

1. A method for configuring an aircraft for low sonic boom supersonic flight conditions comprising:

scaling by a computer an equivalent area distribution curve of the aircraft to approximate an ideal equivalent area distribution goal curve; and relaxing by a computer a design constraint that requires the equivalent area distribution curve of the aircraft to be less than or equal to (≦) the equivalent area distribution goal curve instead of equal (=) to the equivalent area distribution curve; and determining by a computer an optimum configuration according to at least one of: lift-to-drag ratio and low sonic boom.

2. The method according to claim 1 further comprising:
segmenting by a computer a wing of the aircraft into panels;
analyzing by a computer the flow characteristics for each panel; and
smoothing by a computer the configuration of each panel with adjacent panels along the span and the chord of the wing to smooth the wing surface.

3. The method according to claim 1 further comprising:
determining by a computer design variables at the root and the tip of a wing of the aircraft along Mach angle lines (X−Beta*R).

4. The method according to claim 3 further comprising:
limiting by a computer the length of the excursion of the equivalent area distribution curve below the equivalent area distribution goal curve by dividing the excursion into at least two smaller excursions.

5. The method according to claim 3 further comprising:
analyzing by a computer the sonic boom disturbance below and to the side of the aircraft; and
perturbing by a computer aircraft design variables to meet sonic boom constraints below and to the side of the aircraft.

6. The method according to claim 1 further comprising:
determining by a computer an incidence angle for a wing root of the aircraft for maximum lift-to-drag and connection to a fuselage; and
determining by a computer the shape of the remaining portions of the wing for maximum lift-to-drag.

7. The method according to claim 6 further comprising:
re-determining by a computer the incidence angle for the root of a wing of the aircraft and the remaining portion of the wing to meet less than or equal to equivalent area low sonic boom constraints and maximum lift-to-drag.

8. The method according to claim 1 further comprising:
dividing by a computer a flight regime of the aircraft into multiple flight modes;
determining by a computer an optimum configuration of non-moving components for one of the flight modes; and
determining by a computer an optimum configuration of moving components for the other flight modes based on the configuration of non-moving components.

9. The method according to claim 1 further comprising:
determining by a computer a minimized sonic boom disturbance of an F-function; and
scaling by a computer the equivalent area distribution goal curve to maintain the desired aircraft weight while countering excursions below the equivalent area distribution goal curve.

10. The method according to claim 1 further comprising:
adjusting by a computer the configuration of a wing on the aircraft to redistribute areas of lift on the wing; and
reshaping by a computer a fuselage of the aircraft in combination with the wing to match the equivalent area distribution goal curve.

11. The method according to claim 10 further comprising:
redistributing by a computer the areas of lift subject to center-of-pressure constraints to achieve desired balance characteristics for the aircraft.

12. A method for configuring an aircraft for supersonic flight with low shock wave disturbance constraints comprising:
redistributing by a computer lift of a wing by configuring the wing with areas of far-field expansion ahead of areas of far-field compression; and
scaling by a computer an equivalent area distribution goal curve to maintain the desired aircraft weight while countering excursions below the equivalent area distribution goal curve.

13. The method according to claim 12 further comprising:
segmenting by a computer the wing into panels;
analyzing by a computer the flow characteristics for each panel; and
interpolating by a computer the configuration of each panel with adjacent panels to smooth oscillations in the wing surface chordwise, and spanwise along Mach angle lines.

14. The method according to claim 12 further comprising:
analyzing by a computer perturbations of design variables at the root and the tip of the wing along Mach angle lines.

15. The method according to claim 12 further comprising:
analyzing by a computer perturbations of design variables along a mid-section portion of the wing.

16. The method according to claim 12 further comprising:
determining by a computer an incidence angle for the wing for maximum lift-to-drag; and
determining by a computer the shape of the remaining portions of the wing for maximum lift-to-drag; and
re-determining by a computer the incidence angle and shape of the wing to also meet low sonic boom constraints.

17. The method according to claim 12 further comprising:
redistributing by a computer the lift of the wing with center-of-pressure constraints for aircraft balance.

18. The method according to claim 12 further comprising:
dividing by a computer a flight regime of the aircraft into multiple flight modes;
determining by a computer an optimum configuration according to sonic boom constraints at a flight condition; and
determining by a computer another optimum configuration to minimize drag at another flight condition subject to sonic boom constraints.

19. The method according to claim 12 further comprising:
dividing by a computer the areas of far-field expansion and far-field compression into at least two areas of expansion and compression to reduce the magnitude of the sonic boom disturbance.

20. The method according to claim 12 further comprising:
determining by a computer a desired magnitude of sonic boom disturbance on an F-function; and
scaling by a computer the equivalent area distribution goal curve to maintain the desired aircraft weight while countering excursions below the equivalent area distribution goal to achieve the desired magnitude of sonic boom disturbance.

21. The method according to claim 12 further comprising:
analyzing by a computer the sonic boom disturbance below and to the side of the aircraft; and
configuring by a computer the aircraft to meet sonic boom constraints below and to the side of the aircraft.

22. The method according to claim 12 further comprising:
allowing the user to define a design variable by a computer with limits that allow variation in the incidence angle of the wing where the wing joins the aircraft within a range that allows the wing to be connected to the aircraft.

\* \* \* \* \*